United States Patent Office 3,043,750
Patented July 10, 1962

3,043,750
PROCESS FOR PRODUCING VITAMINS IN THE $B_{12}$ GROUP BY MEANS OF PROPIONIC ACID BACTERIA
Elisabeth Becher, Stockstadt (Main), and Konrad Bernhauer and Georg Wilharm, Aschaffenburg, Germany, assignors to Hoffmann-La Roche Inc., Roche Park, Nutley, N.J., a corporation of New Jersey
No Drawing. Filed Dec. 15, 1959, Ser. No. 859,574
Claims priority, application Switzerland Dec. 24, 1958
4 Claims. (Cl. 195—96)

This invention relates to a method of producing vitamins of the $B_{12}$ group by fermentation with propionic acid bacteria of a medium containing carbohydrates, amino acids and nutrient salts, characterized particularly in the use of Propionibacterium shermanii Strain 33 as the specific microorganism.

Propionibacterium shermanii Strain 33 can be obtained from milk curd in the following manner:

Enrichment culture.—In each of a series of test tubes, 1 g. of milk curd (the several portions being of various origins) is mixed with 10 cc. of a nutrient medium having the following composition per liter:

10 g. glucose
1.5 g. nitrogen in the form of a casein proteolyzate
1 g. nitrogen in the form of a casein acid hydrolyzate
1.6 g. $NaH_2PO_4$
1.6 g. $K_3PO_4$
0.4 g. $MgCl_2.6H_2O$
10 mg. $FeSO_4.7H_2O$
12 mg. $CoSO_4.7H_2O$
4 mg. pantothenic acid
0.3 mg. biotin
5 g. yeast extract
Q.s. to 1 liter—water The pH value of the solution is adjusted to 6.8 and the medium is sterilized in conventional manner. Each test tube is filled with 10 cc. of the nutrient medium and then covered with a thin layer of paraffin oil. The test tubes are kept in a thoroughly evacuated desiccator at 30° C. for four to five days in the presence of a dish containing 10% alkaline pyrogallol solution. In this way, interference from other germs is effectively suppressed.

Pure culture.—The obtainment of a pure culture is advantageously carried out by growth of the culture in deep layers (10 cm. depth in the test tube) by use of the same nutrient medium described above, which, however, is solidified with 2% by weight of agar. Each of the several enrichment cultures described above is individually introduced in increasing dilutions into the sterile liquefied agar at 40° C. and distributed well by rotating the test tubes. The individual samples are then incubated in a desiccator in the manner described above. Those test tubes are selected for isolation of the desired material which do not exhibit excessive growth, i.e. which contain well separated bacterial colonies. The selected tubes are heated for a short time in a water bath so that the agar plug can be removed to a sterile Petri dish. The individual colonies occurring in the lower third of the plug, which have grown under the most nearly anaerobic conditions, are separated with a platinum needle and inoculated in a further quantity of the same medium employed above for obtaining the enrichment culture. The cultures thus obtained are further cultivated under as strictly anaerobic conditions as possible, as described above for obtainment of the enrichment culture.

The several samples thus obtained are tested in conventional manner to ascertain their capacity to produce vitamin $B_{12}$ activity. The selection process as described under the caption "Pure culture" is repeated.

Newly obtained pure cultures do not at first produce much fermentation. Only upon further cultivation in deep layer liquid medium, with maintenance of strictly anaerobic conditions, does the capacity for growth and fermentation increase; the vitamin $B_{12}$ production then reaches a level of at least 15 mg. per liter of fermentation medium.

The following further mode of operation has been found to be desirable for obtaining cultures having a high fermentation capacity.

Samples of the nutrient medium are inoculated by pouring over them 10% of their volume of the pure culture obtained as described above. Air is removed from the medium by displacement with carbon dioxide, to a gauge pressure of one atmosphere in the fermentation vessel. It is then incubated for two days at 30° C. During this time, the glucose is depleted and the pH falls to 4.5. The pH is brought to 6.6 by means of saturated sodium carbonate solution, and 1% by weight of glucose is added. Mixing is effected by means of carbon dioxide gas passed through a sterile cotton-wool filter and distributed into the medium in finely divided form. Incubation is effected for a further period of two days at 28° C., keeping the medium under a carbon dioxide pressure of one atmosphere gauge. In this manner, the high performance strain 33 is finally cultivated out.

Propionibacterium shermanii Strain 33 obtained as described above possesses the following characteristics: The cells of the culture are in the diplo form and occur in short chains having at most four members. By employing the above described medium, keeping the amount inoculated below about 10%, effecting the fermentation anaerobically so far as possible, continuously correcting the pH, and adding sugar, the size of the cells remain below 0.5 $\mu$. In other particulars, upon identification in accordance with Bergey's "Manual of Determinative Bacteriology," there are found all the characteristics there set forth for Propionibacterium shermanii. Strain 33 is dintinguished particularly by its especially satisfactory fermentation, for example in a glucose medium. However, it ferments lactose only moderately and very slowly, in contrast to the indications for the species set forth in Bergey's work above referred to. Propionibacterium shermanii Strain 33 is deposited with the American Type Culture Collection under No. 13673 and is available there.

The special characteristics of Strain 33, i.e. its high capacity for producing vitamin $B_{12}$, the size of the bacterial cells which are smaller than normal for the species, and the rapid increase of the thickness of bacterial colonies, is exhibited only upon numerous passages through the liquid medium, as set forth above.

It is advantageous to carry out the fermentation procedures of the invention under anaerobic conditions at temperatures of from about 28° to about 32° C., for periods of from about 10 days to about 12 days, in a sterile medium which contains an assimilable sugar, an amino acid mixture obtained by proteolytic and/or hydrolytic degradation of proteins, conventional nutrient salts, a source of cobalt, pantothenic acid, biotin and 5,6-dimethylbenzimidazole, while continuously or from time to time adding additional quantities of sugar, and maintaining the pH value between about 6 and about 7. Especially suitable as the sugars to be employed are glucose, invert sugar and maltose. The amino acid mixture can be obtained from either plant or animal albumins, e.g. wheat or corn gluten, potato or soya proteins, casein, blood albumin, fish albumin, and the like. Upon completion of the fermentation, the bacterial mass can advantageously be separated from the fermentation broth by centrifugation or filtration and the vitamins of the $B_{12}$ group contained therein can be isolated by methods known per se.

A particularly appropriate mode of carrying out the invention comprises (1) preparing an aqueous fermentation medium which contains from about 1% to about 2% by weight of a fermentable sugar, e.g. glucose, invert sugar or maltose; an amino acid mixture obtained preferably from casein, by proteolytic degradation by means of trypsin and by acid hydrolysis, in a concentration corresponding to about 2.5 g. of nitrogen per liter of fermentation medium; sodium, potassium, magnesium, iron, phosphate, sulfate and chloride ions in conventional concentration; a little pantothenic acid, biotin and cobalt; which is at a pH of about 6.6 and has been sterilized; (2) inoculating the medium with 10% by volume of a 3- to 5-day old preliminarily prepared culture of *Propionibacterium shermanii* Strain 33 in the same fermentation medium which in addition contains a little yeast extract; (3) incubating the mixture at temperatures of from about 28° to about 30° C. for a period of from about 10 to about 12 days, while continuously maintaining a total volume percentage of sugar of from about 5 to about 8; (4) somewhat after the first third of the total incubation period, adding 5,6-dimethylbenzimidazole, preferably in the form of an approximately 70% alcoholic solution, to a concentration of about 20 mg. per liter of fermentation medium; (5) separating the bacterial mass from the fermentation medium, and suspending the separated bacterial mass in water; (6) adjusting the pH of the suspension to about 6, and heating for a few minutes at temperatures of from about 85° to about 120° C.; and (7) centrifuging, neutralizing the combined centrifugation filtrates, adsorbing on activated carbon the therein contained vitamins, eluting the same by means of an aqueous alcohol, preferably isopropanol, and isolating the vitamins in crystalline form from the combined eluates by procedures known per se. It is appropriate to extract the bacterial mass with small amounts of water (at most three or four times) until the last extract is barely colored.

The fermentation broth obtained according to the above procedure can be worked up as such, by known methods, to yield a vitamin $B_{12}$-containing concentrate, useful for example in the preparation of feedstuffs. However, the vitamin $B_{12}$-containing bacterial mass obtained as described above can also be employed as such for the same purposes.

The invention is further disclosed in the following example, which is illustrative but not limitative thereof. Temperatures are stated in degrees centigrade.

*Example*

10 liters of a medium are prepared, which contain the following ingredients: an amino acid mixture obtained by acid hydrolysis of casein, corresponding to a nitrogen content of 10 g.; an amino acid mixture obtained by tryptic digestion of casein, corresponding to a nitrogen content of 15 g.; 16 g. each of $NaH_2PO_4$ and $K_3PO_4$; 4 g. of $MgCl_2.H_2O$; 100 mg. of $FeSO_4.7H_2O$; 120 mg. of $CoSO_4.7H_2O$; 40 mg. of pantothenic acid; 3 mg. of biotin; 100 g. of technical glucose; and sufficient water to make up the total volume of 10 liters. The pH value is adjusted to 6.6, the medium is sterilized, and then is inoculated with 1 liter of a culture of *Propionibacterium shermanii* Strain 33 which has been grown for four days at temperatures of 28–30° in the same medium to which is added, however, 5 g. of yeast extract per liter.

After inoculation, the mixture is allowed to ferment, first for two days at 30°, then at 28°; while adjusting the pH value to 6.6 daily from the second day of fermentation on. When the sugar content has decreased below 0.5%, concentrated sterile glucose solution is added daily, to maintain the concentration at 1% by weight of the medium. Fermentation is thus maintained for ten days. On the fifth day of fermentation, there is added to the fermentation mixture 5,6-dimethylbenzimidazole in 70% alcoholic solution, in a quantity of 20 mg. per liter.

After fermentation for 12 days, the fermentation broth, which now according to microbiological estimation contains a vitamin $B_{12}$ activity of 18.8 mg. per liter, is centrifuged, thereby yielding 250 g. of a damp bacterial mass. The latter is suspended in 1 liter of water, the suspension is mixed with 0.1 g. of sodium sulfite per liter, the pH is set to 6.0, and the suspension is heated for 15 minutes at 90°. Then the suspension is cooled and centrifuged, and the extraction process is repeated four more times with smaller quantities of water. There is thus obtained an orange-red colored aqueous extract, amounting to 20% of the volume of the original fermentation medium. To the extract is added 1% by volume of activated carbon, and the mixture is stirred one-half hour. The suspension is centrifuged, and the carbon adsorbate thus separated is eluted eight times, each time for ten minutes with a mixture of 70 volume percent isopropanol, 25 volume percent water and 5 volume percent benzene, at boiling temperature. There is thus obtained a pure red eluate in a quantity corresponding to 8 volume percent of the original medium. By distillation in vacuo the eluate is concentrated to one-tenth of its volume, i.e. to about 0.8 percent of the volume of the original medium.

This concentrate contains, as determined by spectrophotometric estimation, 2.2 mg. of vitamin $B_{12}$ per cc., corresponding, therefore, to 17.6 mg. per liter of original fermentation medium. Upon further working up of this eluate-concentrate, there is obtained 15.3 mg. of crystalline cobalamine per liter of original medium.

We claim:

1. In a process for producing vitamin $B_{12}$ activity by fermentation of a nutrient medium with a Propionibacterium microorganism, the improvement which comprises employing *Propionibacterium shermanii* Strain 33 as the microorganism.

2. A process for producing vitamin $B_{12}$ activity which comprises fermenting a nutrient medium with *Propionibacterium shermanii* Strain 33 under substantially anaerobic conditions.

3. A method of producing a cobalamine which comprises growing *Propionibacterium shermanii* Strain 33 in a nutrient medium containing assimilable sources of carbon, nitrogen and cobalt, under anaerobic conditions and at temperatures between about 28° C. and about 32° C.

4. A process of producing a cobalamine which comprises fermenting an aqueous medium containing a fermentable sugar, an amino acid mixture and an assimilable source of cobalt with *Propionibacterium shermanii* Strain 33 under substantially anaerobic conditions at temperatures between about 28° C. and 32° C., while maintaining the pH concentration between about 6 and about 7 and while maintaining the sugar concentration between about 1% and about 2% by weight.

References Cited in the file of this patent

UNITED STATES PATENTS 2,715,602     Hargrove et al.    _____ Aug. 16, 1955

UNITED STATES PATENT OFFICE
CERTIFICATE OF CORRECTION

Patent No. 3,043,750                                          July 10, 1962

Elisabeth Becher et al.

It is hereby certified that error appears in the above numbered patent requiring correction and that the said Letters Patent should read as corrected below.

Column 1, line 12, for "of" read -- for --; line 36, for "Q.s. to 1 liter-water" read -- q.s. to 1 liter-water --; line 64, for "in" read -- into --; column 2, line 40, for "dintinguished" read -- distinguished --; column 3, line 59, for "$MgCl_2.H_2O$" read -- $MgCl_2.6H_2O$ --.

Signed and sealed this 25th day of December 1962.

(SEAL)
Attest:

ERNEST W. SWIDER                                      DAVID L. LADD
Attesting Officer                                            Commissioner of Patents